United States Patent [19]

Crater et al.

[11] Patent Number: 5,950,006
[45] Date of Patent: Sep. 7, 1999

[54] OBJECT-ORIENTED PROGRAMMABLE CONTROLLER

[75] Inventors: Kenneth C. Crater, North Grafton; Daniel L. Pierson, Hudson, both of Mass.

[73] Assignee: Control Technology Corporation, Hopkinton, Mass.

[21] Appl. No.: 08/964,998

[22] Filed: Nov. 5, 1997

[51] Int. Cl.[6] ........................................ G06F 9/45
[52] U.S. Cl. ........................................ 395/705
[58] Field of Search ............................ 395/705

[56] References Cited

U.S. PATENT DOCUMENTS

| | | | |
|---|---|---|---|
| 5,097,533 | 3/1992 | Burger et al. | 395/500 |
| 5,230,049 | 7/1993 | Chang et al. | 395/700 |
| 5,453,933 | 9/1995 | Wright et al. | 364/474.23 |
| 5,594,858 | 1/1997 | Blevins | 395/326 |
| 5,611,059 | 3/1997 | Benton et al. | 395/326 |
| 5,642,467 | 6/1997 | Stover et al. | 395/85 |
| 5,812,394 | 9/1998 | Lewis et al. | 364/146 |

*Primary Examiner*—Tariq R. Hafiz
*Assistant Examiner*—Wei Zhen
*Attorney, Agent, or Firm*—Cesari and McKenna, LLP

[57] ABSTRACT

A controller for one or more pieces of industrial equipment is configured to perform a series of control functions each organized into one or more procedures for performing particular machine actions. The progress of an action, or some parameter of the action-taking machine (which may or may not be associated with an action), is represented by one or more "states." A database associates entries corresponding to the items of an object (including the action(s) and the state(s)), and contains storage locations where the associated procedural instructions and/or data are to be found. The action can be independent of state information, or can instead be executed in a manner responsive to a sensed state. The controller may also include diagnostic capability, as well as accumulation and processing of performance data for subsequent analysis.

16 Claims, 7 Drawing Sheets

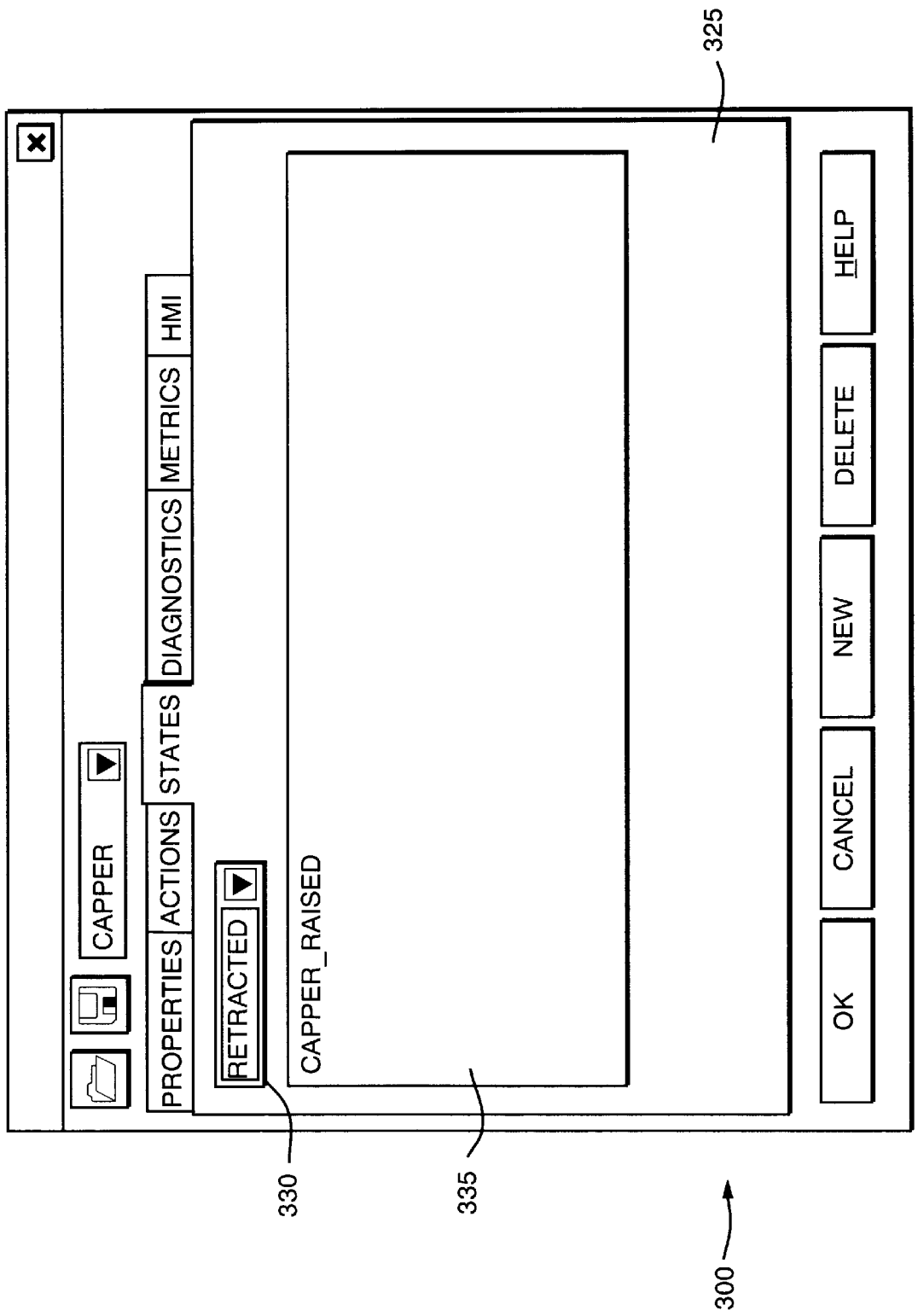

OBJECT-ORIENTED PROGRAMMABLE CONTROLLER

FIELD OF THE INVENTION

The present invention relates to industrial automation, and in particular to programmable controllers for operating and monitoring industrial processes and equipment.

BACKGROUND OF THE INVENTION

Sophisticated industrial processes, such as oil refining, automobile assembly or power generation, require the cooperative execution of numerous interdependent tasks by many different pieces of equipment. The enormous complexity of ensuring proper task sequencing and management, which requires not only appropriate logic but constant monitoring of equipment states to organize and distribute operations and detect malfunction, has resulted in the widespread adoption of programmable controllers. These controllers operate elaborate industrial equipment in accordance with a stored control program. When executed, the program causes the controller to examine the state of the controlled machinery by evaluating signals from one or more sensing devices (e.g., temperature or pressure sensors), and to operate the machinery (e.g., by energizing or deenergizing operative components) based on a logical framework, the sensor signals and, if necessary, more complex processing. The "inputs" to a particular controller can extend beyond the sensed state of the equipment the controller directly operates to include, for example, its environment, the state of related machinery or the state of its controllers.

The instructions governing operation of the controller can be organized in different ways. Regardless of the manner in which they are expressed, however, the instructions must ultimately embody the operation of the controlled equipment in order for the controller to perform its function correctly. Modern industrial controllers, therefore, frequently utilize "state-based" control sequences implemented by a user-programmable state language (such as the QUICKSTEP™ programming language supplied by Control Technology Corporation, Hopkinton, Mass.). State languages are organized by defining control "steps," each of which consists of executable commands that create action, and one or more executable instructions for leaving the step. For example, a step might initiate machine action, then wait for confirmation (e.g., an electronic signal from the controlled machine) that the action has been completed before progressing to the next step, which initiates another machine action. In moving from step to step, action to action, the control program mimics the ordered, sequential nature of most automated machines. Reducing the conceptual distance between operation of the machine and the structure of the control language frees the programmer to focus on the machine being controlled rather than the needs of the control language.

Nonetheless, procedural state languages still suffer from the disadvantages affecting all procedural languages: functions and routines that are repeated must be programmed repeatedly, raising the prospect of error and, as the program becomes complex, obscuring its overall operation by the welter of detail. Furthermore, the frequently intricate, interdependent nature of industrial equipment can render a simple step-by-step procedural framework inadequate for controlling processes with reliability. The controller must be provided with (and its programming must accommodate) routines for handling "exceptions" ranging from sluggish component operation to complete failure of vulnerable components. These routines may take the form of diagnostic or "exception-handling" procedures. As branches from the primary control sequence, such routines further complicate programming in procedural systems.

DESCRIPTION OF THE INVENTION

BRIEF SUMMARY OF THE INVENTION

The present invention offers a more sophisticated yet conceptually simpler paradigm for representing machine operation at the control level, and for programming control systems capable of directing the operation of complex industrial equipment and/or processes. In particular, the invention utilizes an object-oriented framework to "encapsulate" functions, attributes, and procedures, incorporating these within objects representing the entities most naturally associated with the encapsulated items. In this way, those items are established only once and utilized as necessary. An object may correspond to a part of a machine, to the machine itself, or to a class of machines; hierarchically superior (and conceptually more general objects) may be defined so as to be composed of "instances" of subordinate objects. For example, a "machine" object would contain procedures defining machine operations that the associated controller effectuates, as well as information facilitating orderly and reliable execution of those procedures.

In an object-oriented system, closely related data and procedures are treated as a single entity rather than separately. This is achieved by means of an object manager, which includes a database system to manage and organize the data corresponding to these entities or "objects." Design and implementation of object managers is well-known in the art. Basically, an object is a data structure and a set of operations and functions that can access that data structure. The data structure may, for example, be represented as a "frame" having a plurality of "slots," each of which contains an "attribute" of the frame. Each computational operation (a function, procedure, etc.) that can access the data structure is typically called a "method" or an "action."

The database contains a series of pointers associating each object with the methods and attributes (hereafter "object items") making up the object; those items may be stored anywhere—in volatile memory, on a mass-storage device, or even on a separate machine connected via a network interface. By organizing the object items, the database effectively permits each object to carry its own structure and orchestrate its own behavior. This permits the object frame to be "encapsulated" within the object methods; that is, access to the frame is handled primarily or exclusively by the surrounding methods, thereby ensuring data independence. Furthermore, because only the associated methods access the internal data structure, data integrity is maintained.

The object-oriented system of the present invention can be a prototyping system, where objects may be selected from pre-programmed libraries of object templates. For example, if objects corresponding to different robot-arm devices contain much the same information (i.e., the information common to all robot arms is substantial), the library of available object templates contains a "robot arm" prototype that the programmer selects, customizing its attributes to suit the particular device the object is intended to represent.

Alternatively, the system of the present invention can support the property of inheritance, whereby properties or attributes of hierarchically superior objects are automatically inherited by hierarchically subordinate objects. This is accomplished by organizing the objects into hierarchical classes within the database, each class representing the template for a set of similar (in the sense of sharing structure and behavior) objects. Thus, objects in a subclass automatically acquire the object items (e.g., the frames and methods) associated with superior objects. To add a new machine of a particular class to an equipment assemblage, for example, the programmer creates an instance of the class, which automatically inherits all of the object items associated the that class, and then adds programming specific to the particular machine. Consequently, if the machine is a new robot arm added to an assembly line, the new object will already contain procedures for extension and retraction; the programmer then adds routines governing the operation of this particular arm and its relationship to other machines in the assembly line.

Hierarchical relationships among objects are not limited to inheritance and class. In addition, objects can be related to one another based on a hierarchical ranking, with higher-tier "parent" objects having pointers to lower-tier "children" objects. As a result, higher-tier objects may behave as if they "contain" hierarchically related, lower-tier objects for purposes of operation or system organization.

Objects can also delegate tasks to one another. For example, an object may not contain programming to perform a particular method, but instead hold a pointer to another object's method appropriate to the requested task.

Actions are performed on an object, or the entities represented by an object caused to perform an action, by invoking one or more of the encapsulated methods of the object that determine its behavior. A high-level routine requests an object to perform one of its methods by "sending a message" to the object, in effect telling the object what to do. Messages therefore perform a task similar to that of function or procedure calls, and can contain arguments that are acted upon by the method. The receiving object responds to the message by choosing the method that implements the message, executing this method and then returning control to the high-level routine, along with the results of the method.

Again, returning to the robot-arm example, a program step requiring actuation of the arm might, in a procedural language, be represented as a series of instructions turning on a solenoid valve and monitoring the progress of arm extension. In accordance with the present invention, the robot-arm object is told to perform its "extend_arm" method; the procedural logic required to execute the action is already associated with the object, so the object effectively "knows" how to extend the arm.

Accordingly, the invention comprises a framework for control of complex systems. In one aspect, the invention generally comprises a controller for one or more pieces of industrial equipment, the controller being configured to perform a series of control functions each organized into one or more procedures for performing particular machine actions. The progress of an action, or some parameter of the action-taking machine (which may or may not be associated with an action), is represented by one or more "states." An object manager associates entries corresponding to the items of an object (including the action(s) and the state(s)), and contains storage locations where the associated procedural instructions and/or data are to be found. The action can be independent of state information, or can instead be executed in a manner responsive to a sensed state.

Beyond actions and states, objects can also contain items including (i) a list of the "resources" of the object, i.e., the various I/O points, registers, flags, other objects, etc. by means of which actions are effected and states determined; (ii) diagnostic procedures and/or templates (which may be associated with actions or remain separately callable) that evaluate performance of the action against pre-determined criteria and take specified actions if performance deviates from an acceptable range; and (iii) metrics, dynamically updated as the object executes (that is, as the controlled machine runs), which maintain historical and statistical data concerning machine performance.

For example, a diagnostic template may provide multiple, specified, discrete time spans each reflecting a different machine condition, each condition specifying an action associated therewith. If the controlled machine processes a workpiece, early confirmation of action completion may indicate that the machine is not loading properly, while excessive times to completion may signal a jam. Alternatively or in addition, the template may accommodate a range of possible input values (e.g., a control signal whose magnitude indicates the level of a continuously variable parameter such as tank pressure), specifying a different action associated with different input levels. These condition-indicating variables are herein referred to as "limit parameters."

The actions specified in the template entries might include, for example, issuing an alarm, adding the input value or time to a list for contemporaneous or subsequent review by the system operator, updating a display, branching to a failure-recovery sequence, or continuing the present state or process; the absence of an action (e.g., if the input value or time falls within the normal working range specified in the template) allows the controller simply to proceed with program execution. Each template entry, representing a different machine condition (e.g., normal operation and varying degrees of deviation), may be associated with a different action or with no action at all.

More generally, in accordance with the object-oriented approach of the present invention, actions are invoked as tasks initially processed by the object manager, which actually locates the object-bound actions. Typically, a message designates a particular action of an object rather than the object itself. The messages originate either with the high-level control program, which governs operation of a particular machine or set of machines by appropriate messages; or with the executing method of another object.

For example, a series of objects might each control a different component of a single machine. The high-level program dictates overall machine operation, invoking object procedures as necessary for proper control of the different machine components. Alternatively, the overall machine may be only one of several such machines on a factory floor, each machine being represented by an object (and the machine components by objects hierarchically subordinate to the machine objects), with the high-level control program orchestrating operation of the entire assemblage of machines. In this case, procedures of the machine-component objects are called by the machine objects, while procedures of the machine objects are called by the high-level control program.

Thus, in another aspect, the invention comprises a programming facility for a controller. The object representation is provided as a means of simplifying the task of programming the behavior of the controller and, ultimately, that of the controlled equipment. Encapsulating the characteristics, capabilities and functionality of a controlled machine as an object (in the form of actions, states, resources, diagnostics and metrics) provides the programmer with access to information not directly available in more traditional programming representations, and also reduces the complexity of the programming task by "packaging" standard components of functionality.

Consistent with these objectives, the actual programming implementation of the invention can take several forms. On one hand, the objects can be used simply as programming aids that exist only at programming time, disappearing at compile time: that is, a compiler (or interpreter) translates the high-level program, all invoked actions, and other object components that directly participate in controller operation into executable machine code. At the other extreme, the objects retain their complete existence as the program executes. For example, the high-level code might be compiled, while actions are processed by the object manager and retrieved from the object database at run time; in other words, the object items do not become incorporated into a static stream executable code, but are remain as table data accessed as the program executes. In the preferred approach, object items are, in fact, compiled at least partly into executable code, but also remain accessible to the programmer for inspection or alteration. By requiring, for example, run-time lookup of state parameters, diagnostics and metrics, the programmer retains the ability to modify controller behavior by making appropriate changes to the object items (and without directly altering executable code).

BRIEF DESCRIPTION OF THE DRAWINGS

The foregoing discussion will be understood more readily from the following detailed description of the invention, when taken in conjunction with the accompanying drawings, in which:

FIGS. 3A–3E graphically depict of a user interface suitable for data entry into a database in accordance with the invention.

DETAILED DESCRIPTION OF THE PREFERRED EMBODIMENTS

Figure 1:
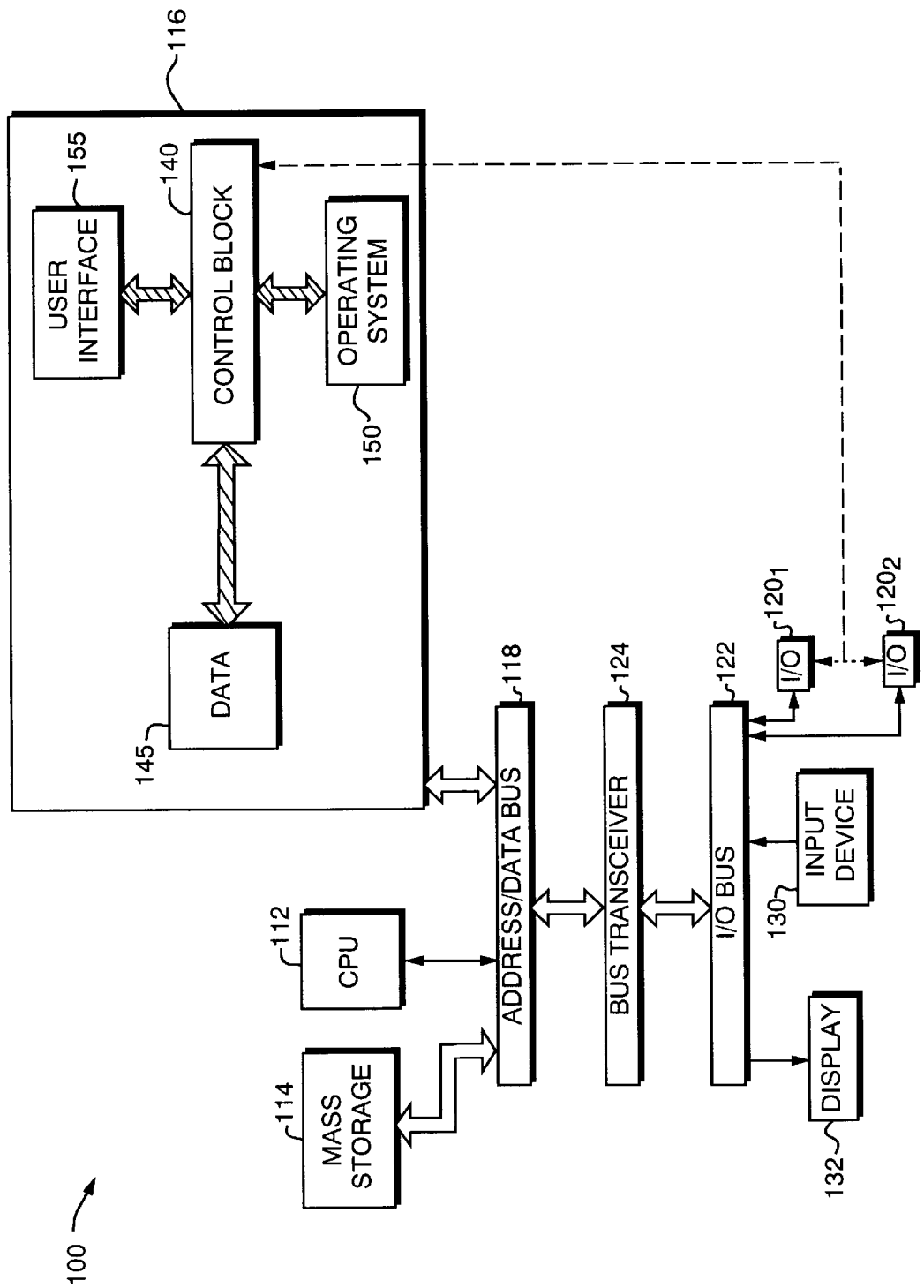
FIG. 1 schematically depicts a control system in accordance with the present invention.

Refer first to FIG. 1, which illustrates generally a hardware architecture for a system embodying the invention. A representative control system, indicated generally at 100, executes program instructions to operate, for example, a piece of industrial equipment. The system 100 includes a central processing unit ("CPU") 112 and one or more computer storage devices indicated generally at 114, 116. Ordinarily, storage device 114 provides nonvolatile mass storage, and may be, for example, an EEPROM, Flash ROM, hard disk or CD-ROM drive; and storage 116 comprises a combination of volatile random-access memory ("RAM") for temporary storage and processing, and non-volatile, programmable read-only memory ("PROM") that contains permanent aspects of the system's operating instructions.

CPU 112 and computer storage 114, 116 communicate over an internal system bus 118. The system 100 further includes a series of input/output (I/O) modules shown representatively at $120_1$, $120_2$ that sense the condition of, and send control signals to, the controlled machine over a machine interface (indicated by arrows). This machine interface, which may involve direct wiring or include a communication link for interaction over a computer network or telephone lines, facilitates the bidirectional exchange of signals between each I/O module and an associated device (e.g., a sensor or an actuator). I/O modules 120 connect to a secondary I/O bus 122, which is driven by a bus transceiver 124; in effect, buses 118, 122 and bus transceiver 124 form a single logical bus.

For simplicity, system 100 is illustrated at a sufficient level of generality to encompass implementations combining both programming and control capabilities, as well as less elaborate controllers whose programming is generated on an external computer and loaded into the controller 100 (e.g., through insertion of a nonvolatile storage medium, over a computer network or serial line, over the Internet, etc.) Thus, the system 100 also comprises one or more input devices 130, also connected to I/O bus 122, that permit the operator to program the controller and/or enter information. The output of either device can be used to designate information or to select particular areas of a screen display 132. In implementations providing complete programming capability, input devices 130 may include a keyboard and a position-sensing device such as a mouse. In implementations providing only control functions, a less extensive input/display system—such as an operator touch screen serving as both input and display device—may be preferred.

Storage 116 contains a series of functional blocks or modules that implement the functions performed by system 100 through operation of CPU 112. A control block 140 contains computer-executable instructions for actually operating controlled equipment via I/O modules 120, and a database organization implementing the object-oriented approach of the present invention. The contents of control block 140 are discussed in greater detail below. For now, it suffices to note that control block 140 contains both the specific high-level instructions for operating the system 100 and the compiler (or interpreter) module for translating these into instructions processed by CPU 112; its operative relationship to I/O modules 120 is indicated by the dashed line. Control block 140 also interacts with a data partition 145, which includes memory cells or blocks serving as registers (for storing particular quantitive values) and flags (to indicate binary status information).

Storage 116 may also include an operating system 150, which directs the execution of low-level, basic system functions such as memory allocation, file management and operation of storage device 114; and instructions defining a user interface 155, which facilitates straightforward interaction over screen display 132. User interface 155 generates words or graphical images on display 132 to represent a simulation, prompt action by the operator, and accept operator commands from input device 130.

Figure 2:
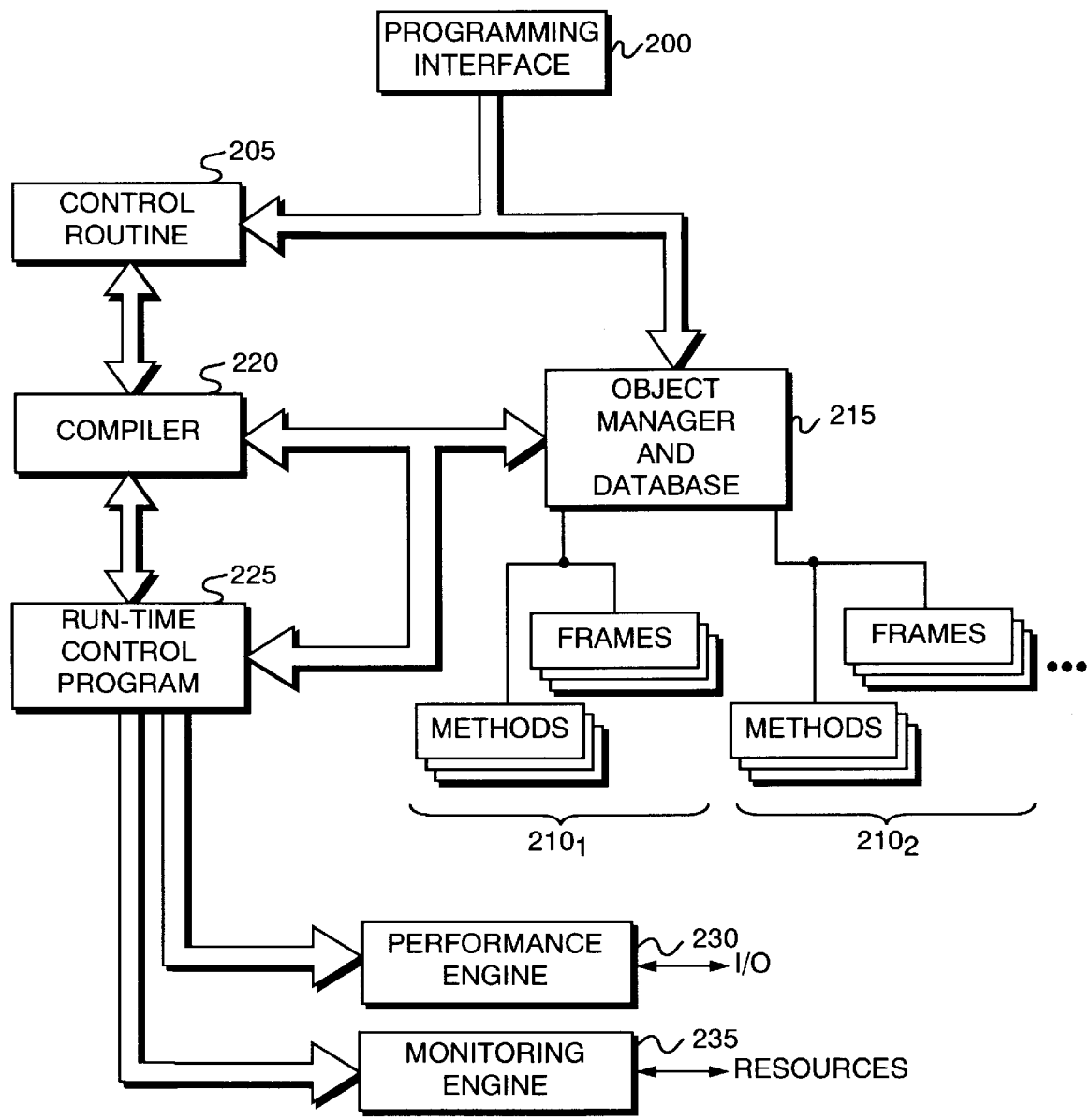
FIG. 2 schematically illustrates the object-management features of the present invention in greater detail.

Refer now to FIG. 2, which illustrates the organization of control block 140 in greater detail. Again for purposes of simplicity, the more elaborate type of system offering both programming and controller functionality is illustrated. A programming interface 200, which communicates with the programmer via user interface 155, allows the programmer to enter instructions (including invocations of object actions) that collectively form the high-level control routine 205; and to define object items and enter data and/or programming functionality into these. In particular, programming interface 200 provides the programmer with the object views described below; information entered by the programmer is organized into a series of objects representatively indicated $210_1$, $210_2$ by an object manager and database 215.

Each object 210 comprises one or more actions defining a control procedure—that is, an action associated with a control function—and a series of frames characterizing the object. An "action" is a step or series of steps performed on the controlled machine (connected to controller 100 by means of I/O modules 120), and is represented by a series of executable instructions defining the action. The steps may directly execute a control function, or may instead bear on that function only indirectly; for example, one action might implement the control function, and another implement a recovery routine should the control function fail.

Object manager 215 maintains organizational control over the objects themselves, which are generally stored in a database format, associating the various frames and methods of each object with the object name by means of pointers (thereby encapsulating the frames of an object within the associated methods, as described above). This form of organization allows both frames and methods to be specified (programmed) once but used repeatedly, since different objects can contain pointers to the same method, while nonetheless retaining integrity as independent objects. If the implementation of the invention supports heritability, object database 215 enforces this property as well.

As will become clear, because of the availability of encapsulated procedures, the high-level control instructions of the present invention are not only less lengthy than those of traditional programmable controllers, but more general as well; the programmer is freed from repeating the low-level commands that define specific control operations (since these are stored in the objects), and need only specify the desired operations themselves. In other words, the programmer need only invoke objects, rather than reproducing the methods they include. Moreover, the methods can be self-operative in the sense of reacting to observed conditions without explicitly being invoked by the programmer.

The control routine 205 is translated into machine-executable instructions by a compiler 220, resulting in a run-time control program 225 (which may be stored in memory 116 or, more typically, in nonvolatile storage 114). As stated earlier, the preferred instructional paradigm for control routine 205 is a state-control language that represents controller actions in terms of steps, each of which consists of a command that creates action and one or more instructions for leaving the step. Interpreters and compilers for this and other types of controller languages are well characterized in the art. See, e.g., U.S. Pat. Nos. 5,321,829 and 5,287,548 (the entire disclosures of which are hereby incorporated by reference) and the QUICKSTEP™ User Guide published by Control Technology Corporation, Hopkinton, Mass.

In one embodiment, compiler 220 accepts not only the control routine 205, but also the various object items specified in the control routine and necessary to its operation. These items are obtained via object manager 215 and compiled along with control routine 205 into run-time program 225. For example, the final run-time program 225 may explicitly contain the executable instructions comprising the actions and state definitions contained in all objects 210 relevant to the control routine 205.

In the preferred embodiment, however, at least some of the object items are not compiled, i.e., remain as table data accessed by run-time control program 225 in the course of its execution. In this case, the instructions of program 225 and the object actions they invoke, are compiled; but the other object items are read in rapid sequence from the object database as run-time program 225 executes. The run-time instructions cause system 100 to examine the condition of selected sensing devices associated with controlled equipment, and, based thereon, to send appropriate operative control signals to the equipment via I/O modules 120.

More specifically, a performance engine 230 implements the control actions specified by the run-time control program 225 through manipulation of the controlled machine at I/O points accessed through I/O modules 120. A monitoring engine 235 receives or accesses data relevant to the action under execution. The data can originate in the controlled machine itself (and be received via an I/O module 120) or within the controller 100, or some combination thereof. For example, the progress of the action may be monitored through a first control point; the temperature of the controlled machine (which must remain within an operating range in order to continue performance of the action) may be monitored through a second control point; the time to completion of the action may be maintained by the controller itself and stored in an internal register; and an internal flag may indicate the completion of a prior, predicate action. These I/O and internal sources of data, which may be queried by monitoring engine 235, are referred to as "resources." Monitoring engine 235 is configured to establish, via I/O modules 120, the control connections necessary to access the listed resources. It should be stressed that, depending on the application, monitoring engine 235 may be a separate module (as illustrated) or may instead be implementing by appropriate monitoring instructions within object methods; the principle of operation, however, remains unchanged.

The role of monitoring engine 235 is ordinarily to provide action-related information—that is, data representing the measurable characteristics of an action, or other relevant characteristics associated with the controlled machine—to performance engine 230, which utilizes this in the course of execution. Typically this means acquiring data relevant to a state specified in one of the frames defining the object. Monitoring engine 235 may simply enter the data into the "State" frame of the object, which is read (in the preferred embodiment, which involves run-time lookup of object items) by performance engine 230 during the course of execution. Alternatively, monitoring engine 235 may perform an analytical or interpretive function, using the data to further characterize the state. For example, an object may contain one or more diagnostic templates that relate various data ranges to specific conditions; in this case, monitoring engine 235 consults the template for the condition specified therein, and determines the value or state of this condition through analysis of the raw data. In either case, the monitoring engine is said to be "determining the state" specified in the frame. These examples also highlight the advantages of the preferred embodiment of the invention, where the executing program retrieves data from a structure also available (as discussed below) as a visible object to the controller's user or to a programmer. This mode of operation assists in program debugging and redesign, since controller behavior can be directly traced to conditions capable of direct examination; as well as verification of proper controller operation.

More generally, however, monitoring engine 235 maintains state information that may bear only indirectly on the method currently under execution. For example, the temperature of the controlled machine may be directly relevant to a particular action (e.g., a high temperature causing, in accordance with the action, branching to an exception-handling routine), as well as more generally relevant to operation of the machine in a global sense (e.g., a dangerously high temperature calls for termination of machine operation regardless of the current action). Indeed, monitoring engine 235 may acquire and maintain a more or less consistent suite of information regardless of the current action; the particular information relevant to the current action is entered into the state frame of the associated object, while other information is ignored.

Conversely, performance engine 230 may not require progress or state information at all. In simple cases—for example, display of an indication on display 132—performance of the action is all that is required, and monitoring is unneeded.

Operation of the invention, as well as the nature and properties of the object frames, is best understood from the perspective of the objects themselves. FIGS. 3A–3E illustrate both the frames and methods of an exemplary object as well as an interactive window for permitting the operator to enter object-defining information and parameters. In accordance with the invention, once the user has characterized all objects necessary for proper functioning of the controller, s/he is free to program controller operation in high-level code that merely invokes the objects—without replicating the lower-level procedural code residing within the objects themselves.

Figure 3A:
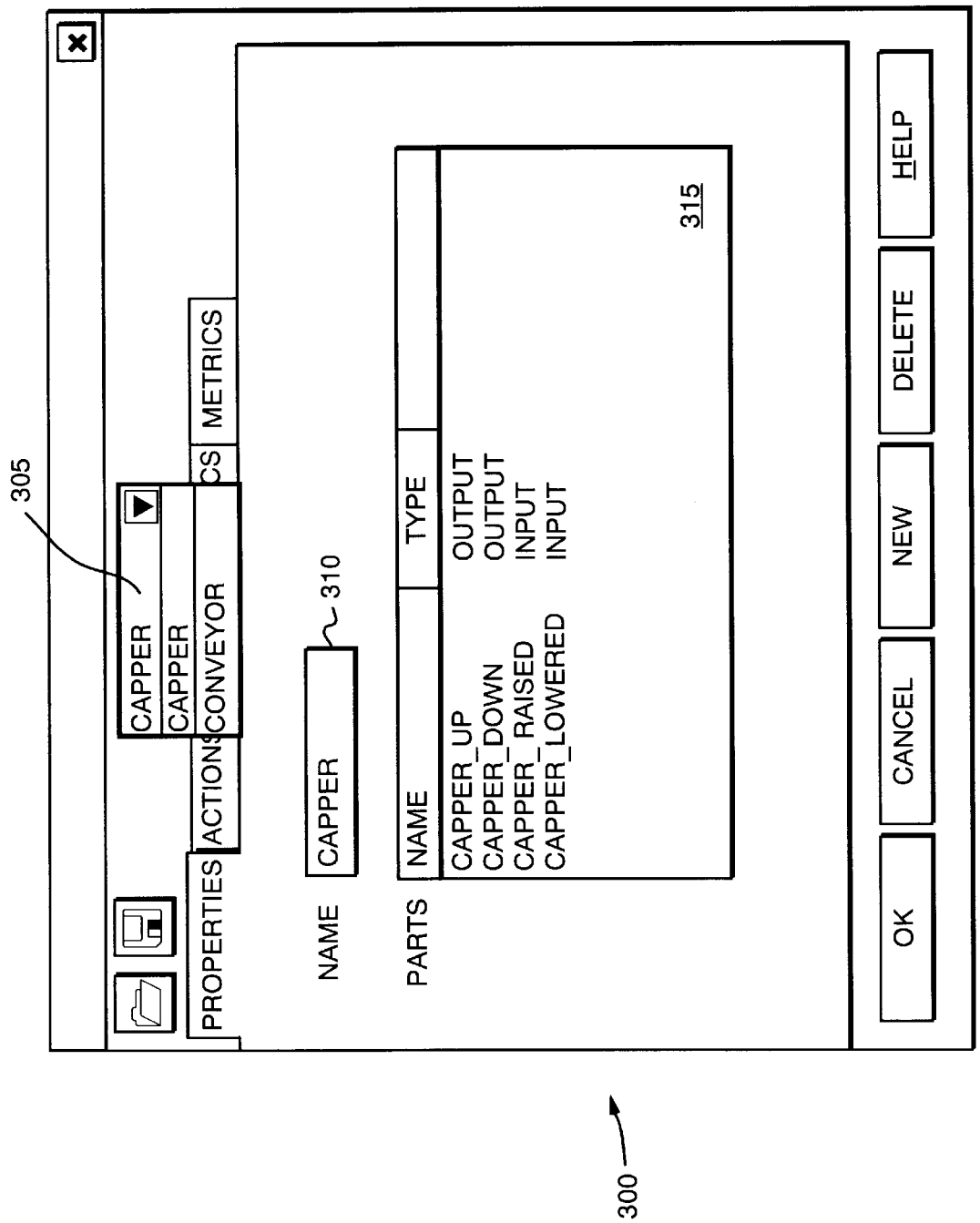

The window 300, which is generated by programming interface 200, can display any of various object components, each of which is identified by a labeled tab that the user may select by clicking with a mouse in accordance with conventional windows display routines. In FIG. 3A, the "Properties" tab has been selected. Boxes 305, 310—the former visible regardless of the selected tab, the latter shown only under the Properties tab—contain the name of the current object. Interface 200 allows the user to specify the name either by typing it into box 305 using keyboard 130 (in which case interface 200 either locates an existing object via object manager 215, or, if no existing object matches the entered name, instructs object manager 215 to create a new object), or by clicking on the down arrow associated with box 305 and selecting from the resulting pull-down list of available objects; the latter operation is illustrated in FIG. 3A, which results in two objects—Capper and Conveyer—being listed. Selection of Capper identifies this object as the current object in box 310, so that the information under each tab is specific to the Capper object. The Capper object controls the mechanism on a bottle-capping machine that actually applies caps to bottles as they pass under the mechanism.

The "Parts" field 315 lists all of the resources (inputs, outputs, registers, flags, subobjects, etc.) that are associated with the object Capper. These resources include two outputs (I/O points to which commands are issued by performance engine 230, via I/O modules 120) and two inputs (I/O points where confirmation signals are received by monitoring engine 235, once again via I/O modules 120). Generally, the resources associated with one object cannot be directly accessed by other objects, although they can be indirectly accessed by sending a command to the object Capper. (This latter capability is standard in the art; see, e.g., U.S. Pat. No. 5,202,981.) Resources and their types are entered by the user via keyboard 130. Performance engine 230 and monitoring engine 235 may consult (via object manager 215) the Parts field of an invoked object in order to establish the necessary control connections.

Figure 3B:
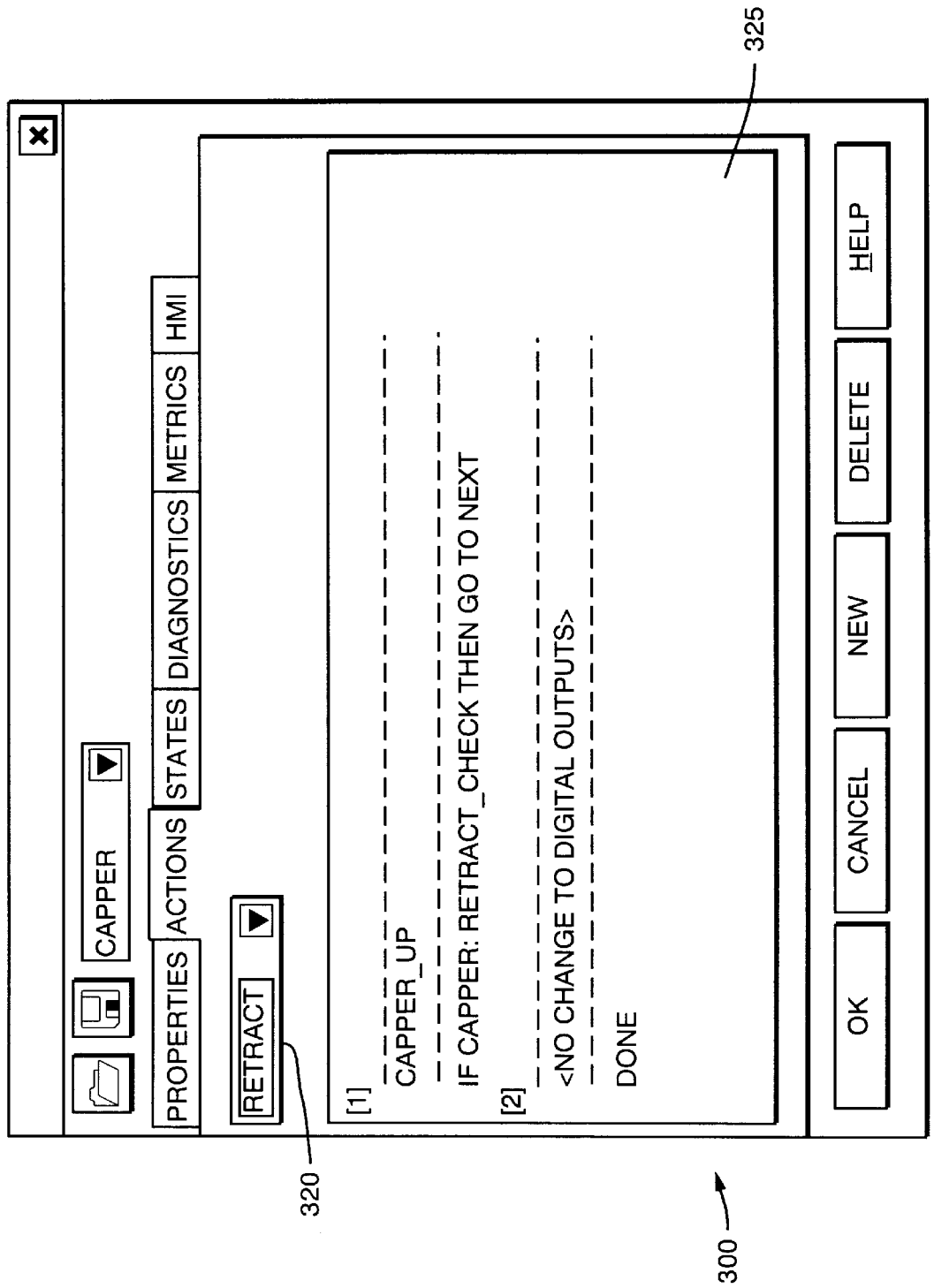

The actions (i.e., methods) associated with an object—that is, the functions (typically mechanical in nature) the object is programmed to perform—are listed under the "Actions" tab, as shown in FIG. 3B. Actions are defined or selected for editing using the name box 320. The actions are each defined by conventional procedural task steps (such as QUICKSTEP™ commands); the tasks defining the selected action—"Retract" in FIG. 3B—are displayed in the window 325. The actions are invoked by the high-level program using a command specifying Capper:Retract, which, when sent to object manager 215, causes the object Capper to execute its action called Retract. The illustrated action contains the command CAPPER_UP, which causes a signal to be sent to the output resource CAPPER_UP (see FIG. 3A); and an instruction, Capper:Retract_Check, referring back to the same object. This instruction tests the state of the object, as discussed below.

The advantages of hierarchical object organization are readily apparent in the context of actions. For example, a hypothetical object named Gripper, designed to control a robotic gripper, might have only two actions named Open and Close. These actions are invoked by the high-level control program or by a hierarchically superior object by calling Gripper. Thus, a higher level object named Loader might control the parts-handling robot of which the robotic gripper is a component part. This object may have more elaborate actions, e.g., Load_Part and Unload_Part, that make use of the functionality embodied in Gripper—that is, the Load_Part and Unload_Part actions would likely contain a number of Gripper:Open and Gripper:Close commands.

The possible states defined for an object are listed under the "States" tab, as shown in FIG. 3C, and may be tested, as just noted, by appropriate instructions issued by the actions within the object itself or by a higher-level control program. States represent test or other conditions associated with an action or with the controlled machine generally. The currently available states are listed in the pull-down menu of box 330, and the characterstics defining the selected state are shown in the window 335. The user may define a new state by typing its name into the box 330 and defining its characteristics in window 335; object manager 215 enters these into the database containing objects 210.

The illustrated example shows a state called Retracted, associated with the object Capper. The definition of this state is a simple one: it characterizes the state of the input resource called CAPPER_RAISED (see FIG. 3A). In more complex cases, the state may reflect a combination of multiple inputs, flags, and tests. By issuing the instruction if Capper:Retracted goto next, an action repeatedly tests whether the state is true—that is, whether the capping mechanism has been raised—and when it is, proceeds to the next step. The goto command indicates that the next step resides within the current action; the statement if Capper:Retracted then done dictates conditional termination of the current action, at which point control routine 205 may invoke a new action.

This example demonstrates how organization of actions and states into objects simplifies machine reconfiguration. Suppose, for example, that an improved bottle-capping mechanism were to add a second limit switch to be tested in combination with the input resource CAPPER_RAISED in order to determine whether the mechanism were fully raised. By changing the definition of the state Retracted to include both tests, the tests would be automatically be performed at all points of the control program referring to this state.

An object can also hold diagnostic information. In particular, an object may contain, for each state, a template specifying conditions and associated processes, actions or states; in this way, various modes of abnormal operation—which may be defined, for example, as deviation by a predetermined extent from a mean limit-parameter value—can be addressed in a manner appropriate to that condition.

Figure 3D:
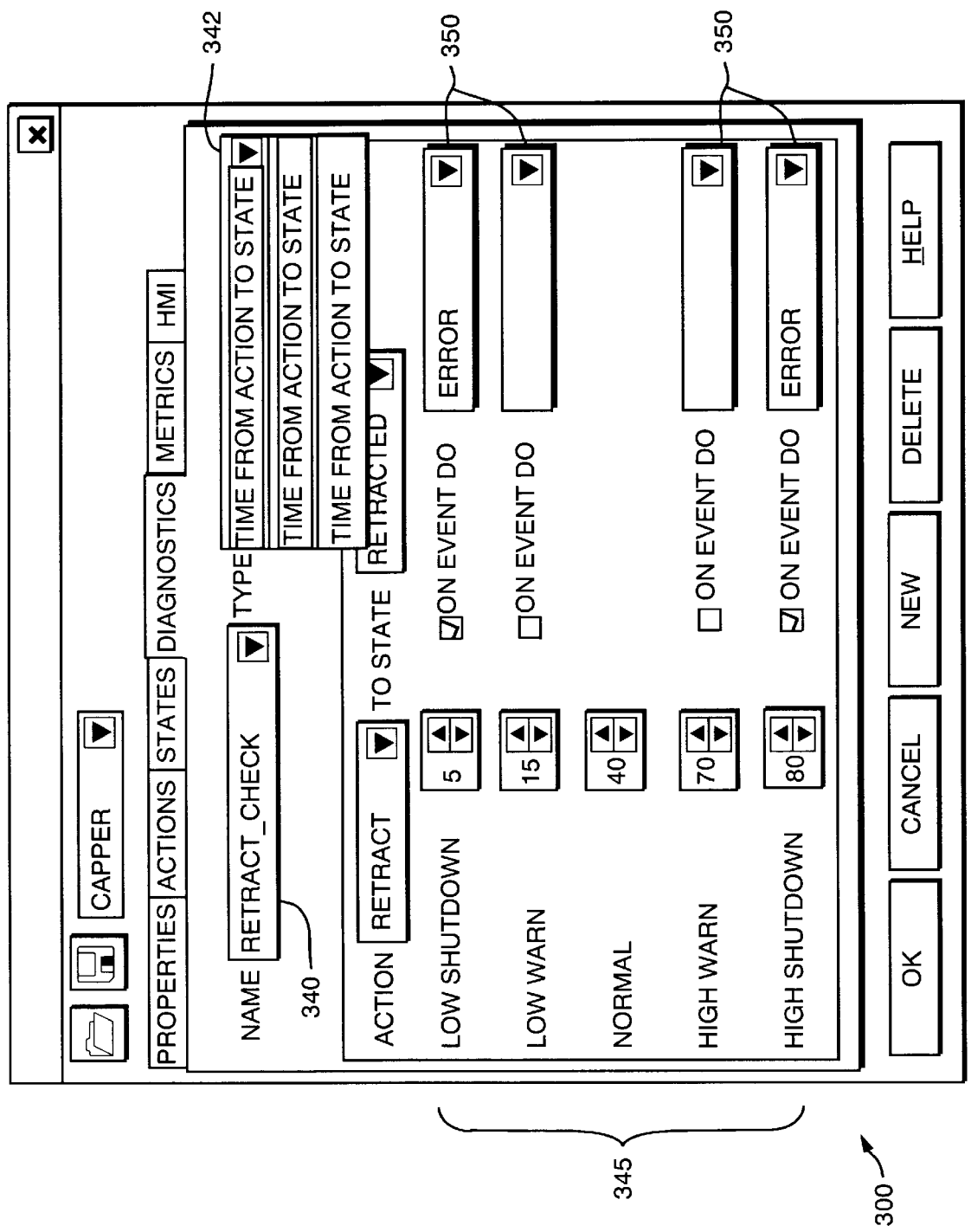

This is illustrated in FIG. 3D, which shows a diagnostic titled Retract_Check (as indicated in the name box 340); this diagnostic analyzes the time between the completion of the action named Retract to achievement of the state named Retracted. More generally, diagnostics relating to the expected timing behavior of an object measure the time between an action and some resulting state, or the time between two related states. This is specified in the Type field 342, which indicates that time is the relevant limit parameter.

The diagnostics frame contains a series of fields (i.e., attributes) relating various values or value ranges of the limit parameter to associated machine conditions, each of which may require a different form of handling—e.g., branching to a different control routine, issuing an alarm, etc. In the illustrated case, the frame contains five fields 345 corresponding to five different machine conditions: Low Shutdown, Low Warn, Normal, High Warn, and High Shutdown. A limit-parameter value (in this case, a time) is entered for each condition in the associated box, either by typing or clicking on the arrows. The significance and interpretation of these entered times depends on the existence of entries in the "On Event Do" fields corresponding to each of the condition fields 350. If an entry is added for a particular condition field, the action stated in the entry is associated with the specified condition.

The diagnostic Retract_Check is configured to register a Low Shutdown condition upon an action-to-state time of 5 msec or less; a Low Warn condition for times in excess of 5 but equal to or less than 15 msec; a normal condition for times between 15 and 70 msec; a High Warn condition for times in excess of 70 but less than 80 msec; and a High Shutdown condition for times in excess of 80 msec. (Naturally, different applications may have different numbers of condition fields.) "On Event Do" actions—i.e., branch routine names or actions to be taken—have been entered for the extreme conditions Low Shutdown and High Shutdown. Upon detection of one of these condition outside the normal range, the object causes the action specified in the On Event Do field to occur—namely, the task called ERROR, which may shut down the machine and issue a notification to the operator. On the other hand, the conditions Low Warn and High Warn may correspond to inefficient machine behaviors or projected failure states, requiring no immediate action or a warning to the operator. These conditions may serve statistical or historical functions (e.g., as performance records associated with the controlled machine), and may be received, for example, by a central station monitoring the performance of all controllers on a network.

Once again, by utilizing run-time object lookup (rather than complete compilation of object contents), the user is permitted to alter the limit parameters and/or their values without the need to recompile the entire program sequence, and may also consult object frames in real time to determine current values (which are dynamically updated as the controlled machine operates).

Figure 3E:
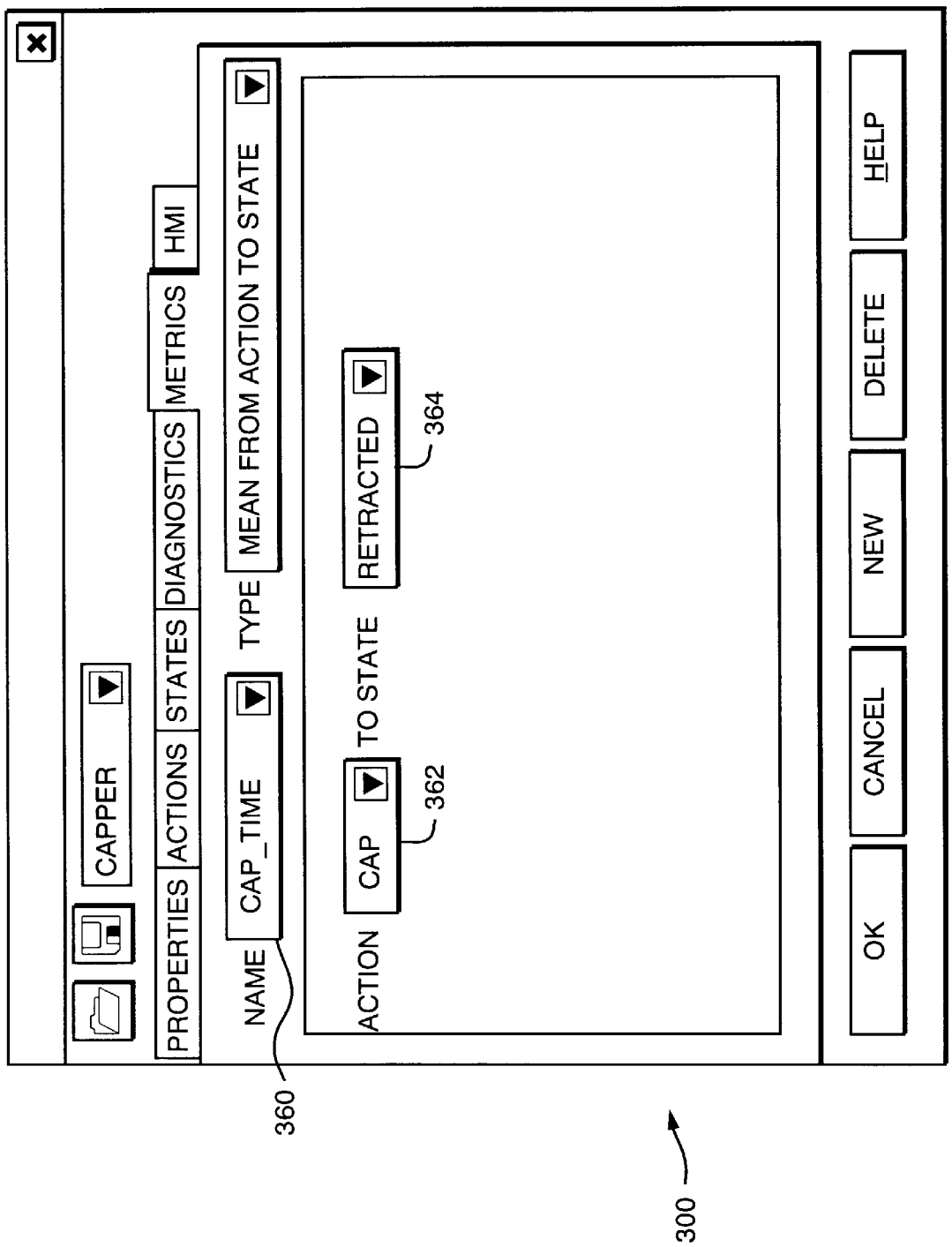

Also relevant to ongoing monitoring of machine performance is the "Metrics" frame shown in FIG. 3E. This frame facilitates accumulation and processing of data relating to control transitions—generally, the time between an action and a succeeding state. The name of the transition is entered in the name box 360, and the action and state defining the transition are entered in boxes 362 and 364, respectively. Thus, the metric named Cap_Time records each transition interval between the action Cap and the state Retracted. The "Type" field specifies an operation performed on the measured intervals, the result of which is stored in a data partition associated with the metric. In the illustrated example, the metric Cap_Time keeps running track of the mean interval time; this value remains associated with the name Cap_Time, and may be examined or utilized like any named variable. Multiple metrics can be applied to the same interval; for example, a different metric might utilize the same interval but perform thereon a different statistical operation. In addition to time-based measurements, metrics can track other quantitative performance indicators such as production or reject counts.

The Properties, States, Diagnostics, and Metrics frames all contain data representative of the objects with which they are associated. Some of these data (such as the object name) are static, while other data (such as Metrics) are dynamically updated. Still other frames (such as Diagnostics) specify operations involving monitoring of resources and the triggering of actions in response to detected conditions.

Preferably, the objects are organized such that they are invoked not by name, but by particular components. A high-level program (or hierarchically superior object) refers not to an object as a whole, but to a method or frame of the object. For example, a command to execute the Retract action of Capper would not call Capper, but would instead specify the method Capper:Retract, typically by means of a "do" instruction (e.g., do (Capper:Retract) goto next). States may be invoked within an action (as shown above) or in the high-level control program to test conditions predicate to branching or proceeding; for example, states may be tested as part of an "if" statement—if the state is true, the next action is taken (e.g., if Capper:Retracted goto Conveyor).

Diagnostics may be explicitly invoked as tests predicate to proceeding, as shown in FIG. 3B (if Capper:Retract_ Check then goto next), or may instead be self operative merely as a consequence of object presence or invocation of any object action. In the latter case, the instructions defining the diagnostic are executed on an ongoing basis by monitoring engine 235. Similarly, metrics may be executed upon command, or automatically—either by direct implementation by monitoring engine 235 (again, as a consequence of object presence or action invocation) or by code automatically inserted into a program that invokes a particular action.

It will therefore be seen that the foregoing represents a convenient and highly versatile approach to control organization that expands capabilities while minimizing programming effort and reducing the likelihood of error. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A programmable apparatus for performing a plurality of user-selectable control functions, the apparatus comprising:
   a. a database for storing a plurality of items associated with each of the control functions, the items including, for each function:
      i. at least one procedure for performing a plurality of actions associated with the control function;
      ii. a specification of at least one state associated with each procedure;
   b. means facilitating selection of a procedure in the database;
   c. means responsive to the selection for accessing the database and causing performance of the selected procedure to achieve the states specified therein; and d. means for monitoring at least one resource associated with the actions of the procedure and, based thereon, determining whether the specified states have been achieved.

2. The apparatus of claim 1 wherein the performance means is responsive to executable instructions causing it to respond, in causing performance of the action, to the state determined by the monitoring means.

3. The apparatus of claim 1 wherein the items further include a list of resources associated with the action, the performance means being configured to establish control connections to the listed action resources to perform the action.

4. The apparatus of claim 1 wherein the items further include a list of resources associated with the state, the monitoring means being configured to establish monitoring connections to the listed state resources to determine the state.

5. The apparatus of claim 4 further comprising:
   a. an input/output module for connection to at least one input/output point on a controlled machine; and
   b. a computer memory comprising a plurality of registers and flags for containing data associated associated with the action, the state resources including the at least one input/output point and the registers and flags.

6. The apparatus of claim 1 wherein the means facilitating selection and the means responsive to the selection comprise:
   a. a compiler;
   b. a series of high-level instructions including instructions invoking the at least one procedure; and
   c. a database manager, responsive to procedure-invoking instructions, for locating the at least one procedure;
the compiler compiling the high-level instructions and the procedure into a machine-executable run-time program.

7. The apparatus of claim 6 further comprising memory means for storing the run-time program.

8. The apparatus of claim 6 wherein the run-time program accesses, during execution, at least one state item by means of the database manager.

9. The apparatus of claim 6 wherein the items further include a template specifying at least one performance characteristic, the monitoring means evaluating the resource against the at least one performance characteristic during performance of the action, the run-time program accessing, during execution, at least one performance-characteristic item by means of the database manager.

10. The apparatus of claim 6 further comprising a programming interface for accepting the high-level instructions and the items, the programming interface communicating with the database manager so as to cause storage of the items in the database.

11. A programmable apparatus for performing a plurality of user-selectable control functions the apparatus comprising:
   a. a database for storing a plurality of items associated with each of the control functions, the items including, for each function:
      i. at least one procedure for performing an action associated with the control function;
      ii. a specification of at least one state associated with the control function; and
      iii. a template specifying at least one performance characteristic, the monitoring means evaluating the resource against the at least one performance characteristic during performance of the action;
   b. means facilitating selection of an action in the database;
   c. means responsive to the selection for accessing the database and causing performance of the selected action; and
   d. means for monitoring a resource associated with the action and, based thereon, determining the state specified in the database.

12. The apparatus of claim 11 wherein:
   a. the performance characteristic comprises a plurality of parameter limit value ranges; and
   b. the template specifies a limit procedure associated with at least one of the limit value ranges, the performance means causing performance of the limit procedure if the parameter value falls within the limit value range.

13. The apparatus of claim 12 wherein the parameter is a time between the action and the state.

14. The apparatus of claim 12 wherein the parameter is a time between first and second states.

15. The apparatus of claim 12 wherein the items further include historical parameter values associated with completions of the action or performances of the limit procedure.

16. The apparatus of claim 15 wherein the monitoring means is configured to dynamically update the historical parameter values upon completion of an action or performance of the limit procedure.

* * * * *

Adverse Decision In Interference

Patent No. 5,950,006, Kenneth C. Crater, Daniel L. Pierson, OBJECT-ORIENTED PROGRAMMABLE CONTROLLER, Interference No. 105,129, final judgment adverse to the patentees rendered January 13, 2004, as to claims 1-16.

*(Official Gazette April 20, 2004)*